United States Patent
Athale et al.

(10) Patent No.: US 10,565,281 B2
(45) Date of Patent: *Feb. 18, 2020

(54) PRODUCTION PHASE WEBSITE LAUNCH (71) Applicant: American Express Travel Related Services Company, Inc., New York, NY (US)

(72) Inventors: Anant Athale, Scottsdale, AZ (US); Srinivas V. Dasari, Scottsdale, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 261 days.

This patent is subject to a terminal disclaimer.

(21) Appl. No.: 15/597,439

(22) Filed: May 17, 2017

(65) Prior Publication Data
US 2017/0249324 A1    Aug. 31, 2017

Related U.S. Application Data (63) Continuation of application No. 14/852,128, filed on Sep. 11, 2015, now Pat. No. 9,684,731, which is a continuation of application No. 14/331,879, filed on Jul. 15, 2014, now Pat. No. 9,158,656.

(51) Int. Cl.
  *G06F 16/958*  (2019.01)
  *G06F 11/36*  (2006.01)
  *G06F 11/34*  (2006.01)
  *H04L 29/08*  (2006.01)

(52) U.S. Cl.
  CPC ........ *G06F 16/958* (2019.01); *G06F 11/3409* (2013.01); *G06F 11/3428* (2013.01); *G06F 11/3612* (2013.01); *H04L 67/02* (2013.01); *G06F 2201/81* (2013.01); *G06F 2201/875* (2013.01)

(58) Field of Classification Search
  CPC ............ G06F 17/3089; G06F 11/3409; G06F 11/3428; G06F 11/3612; G06F 2201/81; G06F 2201/875; G06F 16/958; H04L 67/02
  USPC .................................................. 717/124–135
  See application file for complete search history.

(56) References Cited

U.S. PATENT DOCUMENTS 7,765,295 B2 *  7/2010  Anastas ................ G06F 16/986
                                                         709/224
8,966,446 B1    2/2015  Amacker
9,158,656 B1   10/2015  Athale
                       (Continued)

OTHER PUBLICATIONS

USPTO; Office Action dated Feb. 11, 2015 in U.S. Appl. No. 14/331,879.

(Continued)

*Primary Examiner* — Marina Lee
(74) *Attorney, Agent, or Firm* — Thomas Horstemeyer, LLP (57) ABSTRACT

A method for progressively launching a website is disclosed. A production phase website may be launched or made available to a limited number of consumers. In addition, the performance of the production phase website may be evaluated based upon a comparison of the performance of the production phase website to a performance of the predecessor website. Further, the predecessor website may be replaced with the production phase website.

19 Claims, 2 Drawing Sheets

(56) References Cited

U.S. PATENT DOCUMENTS

| | | | |
|---|---|---|---|
| 9,356,942 B1* | 5/2016 | Joffe | H04L 63/1408 |
| 9,684,731 B2* | 6/2017 | Athale | G06F 11/3612 |
| 10,331,420 B2* | 6/2019 | Nagar | G06F 17/2247 |
| 2003/0053420 A1 | 3/2003 | Duckett et al. | |
| 2003/0061283 A1 | 3/2003 | Dutta et al. | |
| 2003/0078959 A1 | 4/2003 | Yeung et al. | |
| 2004/0068560 A1 | 4/2004 | Oulu et al. | |
| 2005/0075932 A1 | 4/2005 | Mankoff | |
| 2005/0262240 A1* | 11/2005 | Drees | G06F 11/3476 709/224 |
| 2006/0217930 A1 | 9/2006 | Chang et al. | |
| 2006/0218267 A1* | 9/2006 | Khan | H04L 41/00 709/224 |
| 2008/0005164 A1 | 1/2008 | Yee et al. | |
| 2008/0172581 A1 | 7/2008 | Glas et al. | |
| 2012/0303443 A1 | 11/2012 | Zeine et al. | |
| 2014/0129325 A1 | 5/2014 | Zinger et al. | |
| 2014/0359423 A1 | 12/2014 | Dona | |
| 2015/0134629 A1 | 5/2015 | Knobloch | |
| 2016/0019229 A1 | 1/2016 | Athale | |
| 2017/0249324 A1* | 8/2017 | Athale | G06F 11/3612 |

OTHER PUBLICATIONS

USPTO; Final Office Action dated Jun. 25, 2015 in U.S. Appl. No. 14/331,879.

USPTO; Notice of Allowance dated Sep. 4, 2015 in U.S. Appl. No. 14/331,879.

USPTO; Office Action dated Jun. 6, 2016 in U.S. Appl. No. 14/852,128.

USPTO; Final Office Action dated Mar. 2, 2017 in U.S. Appl. No. 14/852,128.

USPTO; Notice of Allowance dated Mar. 15, 2017 in U.S. Appl. No. 14/852,128.

* cited by examiner

PRODUCTION PHASE WEBSITE LAUNCH

CROSS-REFERENCE TO RELATED APPLICATIONS

This application is a continuation of, claims priority to and the benefit of, U.S. Ser. No. 14/852,128 filed Sep. 11, 2015 and entitled "SYSTEMS AND METHODS FOR PROGRESSIVELY LAUNCHING WEBSITES," which issued on Jan. 20, 2017 as U.S. Pat. No. 9,684,731. The '128 application is a continuation of, claims priority to and the benefit of, U.S. Ser. No. 14/331,879 filed Jul. 15, 2014 and entitled "SYSTEMS AND METHODS FOR PROGRESSIVELY LAUNCHING WEBSITES," which issued on Oct. 13, 2015 as U.S. Pat. No. 9,158,656. All of which are incorporated herein in their entirety by reference.

FIELD

The present disclosure generally relates to launching websites, and more particularly, to progressively launching websites to ensure website stability.

BACKGROUND

Typically, website developers test websites under construction as part of a multiphase process. Specifically, websites under construction are typically tested in a "test" phase using test data. The websites are then transitioned (through a variety of test phases) to a "production" phase, where the production phase utilizes real-time transaction data and is exposed to the public as a live website. Errors may occur during the initial launch period. Thus, systems and methods for mitigating or minimizing such errors are desirable.

SUMMARY

As disclosed herein, a method for progressively launching a website is disclosed. A production phase website may be launched or made available to a limited number of consumers. In addition, the performance of the production phase website may be evaluated based upon a comparison of the performance of the production phase website to a performance of the predecessor website. Further, the predecessor website may be replaced with the production phase website. The evaluation may be based upon a website load time and/or a website error. The replacing may be performed in response to the evaluating. The production phase website may be launched to a first subset of consumers at a first time and to a second subset of consumers at a second time. In addition, the production phase website may be rolled back to replace the production phase website with the predecessor website, in response to the evaluating. In various embodiments, the production phase website may be evaluated based upon test data and/or real-time data.

BRIEF DESCRIPTION OF THE DRAWINGS

The features and advantages of the present disclosure will become more apparent from the detailed description set forth below when taken in conjunction with the drawings. The left-most digit of a reference number identifies the drawing in which the reference number first appears.

DETAILED DESCRIPTION

The detailed description of exemplary embodiments herein makes reference to the accompanying drawings, which show the exemplary embodiments by way of illustration and their best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVA® Script, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

As used herein, "transmit" may include sending electronic data from one system component to another over a network connection. Additionally, as used herein, "data" may include encompassing information such as commands, queries, files, data for storage, and the like in digital or any other form.

As used herein, "test" data may comprise any type of data. The data may include, for example, fabricated transaction data, such as fabricated transaction accounts, fabricated transaction data, and the like.

As used herein, "real-time" data may comprise any type of data. The data may include, for example, non-fabricated or actual transaction data, such as transaction data produced as a result of actual or real transactions occurring based upon purchases made by transaction account holders.

Figure 1:
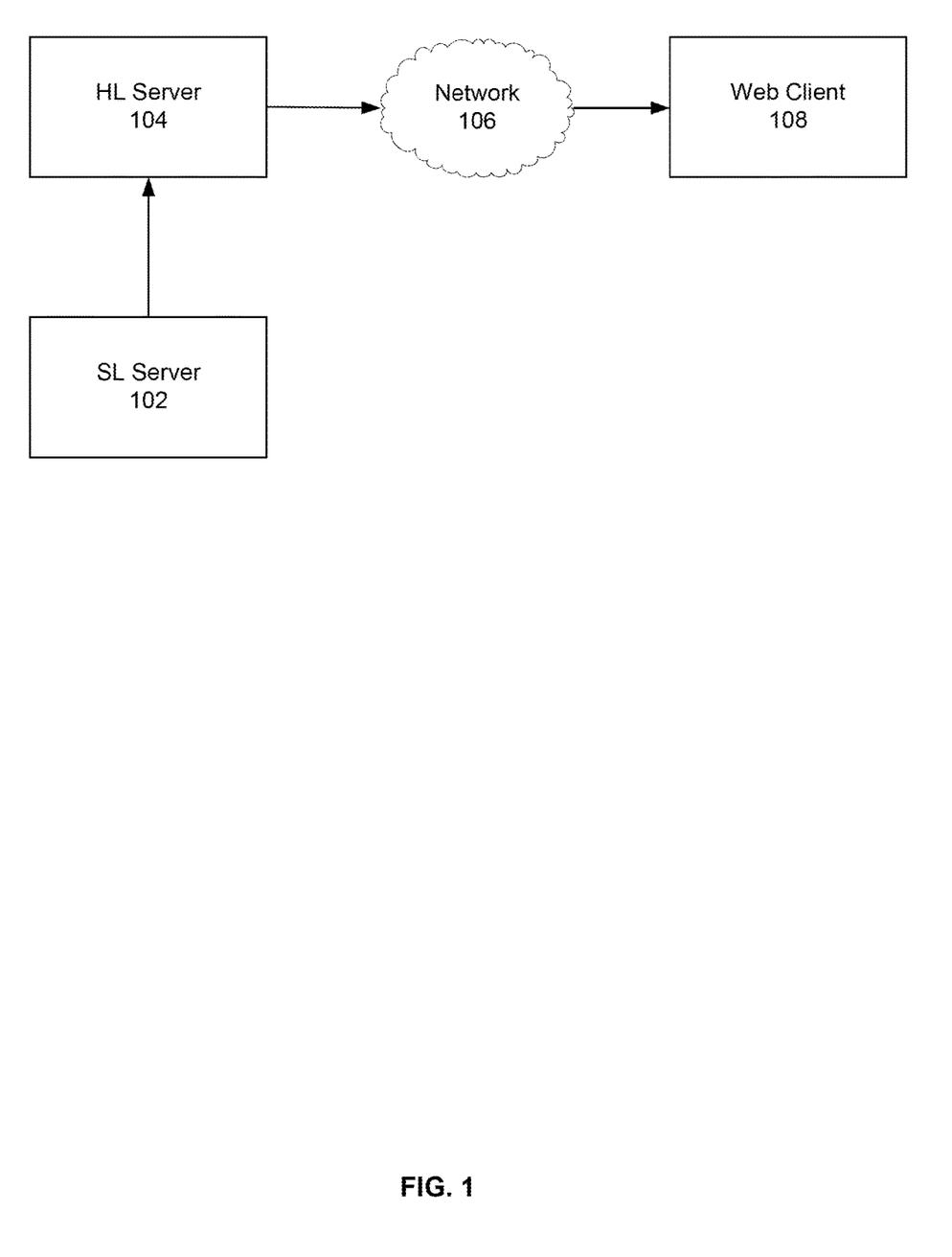
FIG. 1 illustrates, in accordance with various embodiments, a system for progressively launching a website.

Referring to FIG. 1, a system 100 for progressively launching a website is shown. In various embodiments, the system 100 may include a soft-launch (SL) server 102, a hard-launch (HL) server 104, a network 106, and/or one or more web-clients 108.

A soft-launch server 102 may comprise any hardware and/or software (and/or any grouping of hardware and/or software) configured to and/or capable of contributing to the progressive launch of a website. More particularly, a soft-launch server 102 may comprise a server configured to test a website prior to launching the website in a live environment that is available to a particular group (e.g., the public). For example, a soft-launch server 102 may comprise a server configured to test a website that is under development in a first test phase (a "test") phase, a second test phase (a "preproduction" phase), and/or a third test phase (a "production" phase). The production phase may comprise a final version of the website that will be made available over the internet to the public. However, in the soft-launch server 102, the production phase may utilize fabricated test data, as opposed to real-time transaction data.

A hard-launch server 104 may comprise any hardware and/or software (and/or any grouping of hardware and/or software) configured to and/or capable of contributing to the progressive launch of a web site and/or launching or hosting a live web site. More particularly, a hard-launch server 104 may comprise a server configured to make a website available to a particular group (e.g., the public over the internet). A hard-launch server 104 may launch a "production" website that receives and/or analyzes, in any fashion, real-time transaction data.

A network 106 may comprise any electronic communications system or method which incorporates software and/or hardware components. Communication may be accomplished through any suitable communication channels, such as, for example, a telephone network, an extranet, an intranet, Internet, point of interaction device (point of sale device, personal digital assistant, smart phone, cellular phone (e.g., iPhone®, Palm Pilot®, Blackberry®), kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although a network 106 may be described herein as being implemented with TCP/IP communications protocols, the network 106 may also be implemented using IPX, Appletalk, IP-6, NetBIOS, OSI, any tunneling protocol (e.g. IPsec, SSH), or any number of existing or future protocols. If the network 106 is in the nature of a public network, such as the Internet, it may be advantageous to presume the network 106 to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components described herein may be independently, separately or collectively coupled to the network 106 via one or more data links including, for example, a connection to an Internet Service Provider (ISP) over a local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network 106 may be implemented variously. For example, network 106 may be implemented as an interactive television (ITV) network. The systems and methods disclosed herein contemplate the use, sale and/or distribution of any goods, services or information over any network having functionality similar to that described above with reference to network 106.

A web-client 108 may include any device (e.g., personal computing device/mobile communication device) which communicates via any network. A web-client may be associated with and/or used by a consumer, a merchant, or both. A web-client may comprise a variety of browsing software or browser applications (e.g., MICROSOFT® INTERNET EXPLORER®, MOZILLA® FIREFOX®, GOOGLE® CHROME®, APPLE® Safari, or any other of the myriad software packages available for browsing the internet). Such browser applications may comprise Internet browsing software installed within a computing unit or a system to conduct online transactions and/or communications. These computing units or systems may take the form of a computer or processor, or a set of computers/processors, although other types of computing units or systems may be used, including laptops, notebooks, hand held computers, personal digital assistants, cellular phones, smart phones (e.g., iPhone®, BlackBerry®, Droid®, etc.) set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network 106.

As those skilled in the art will appreciate, a web-client 108 may include an operating system (e.g., WINDOWS® NT®, 95/98/2000/CE/Mobile, OS2, UNIX®, LINUX®, SOLARIS®, MacOS, PALM®OS®, etc.) as well as various conventional support software and drivers typically associated with computers. A web-client may implement security protocols such as Secure Sockets Layer (SSL) and Transport Layer Security (TLS). A web-client may implement one or more application layer protocols, including, for example, http, https, ftp, and sftp. Transactions originating at a web client may pass through a firewall (not shown; see below) in order to prevent unauthorized access from users of other networks.

Figure 2:
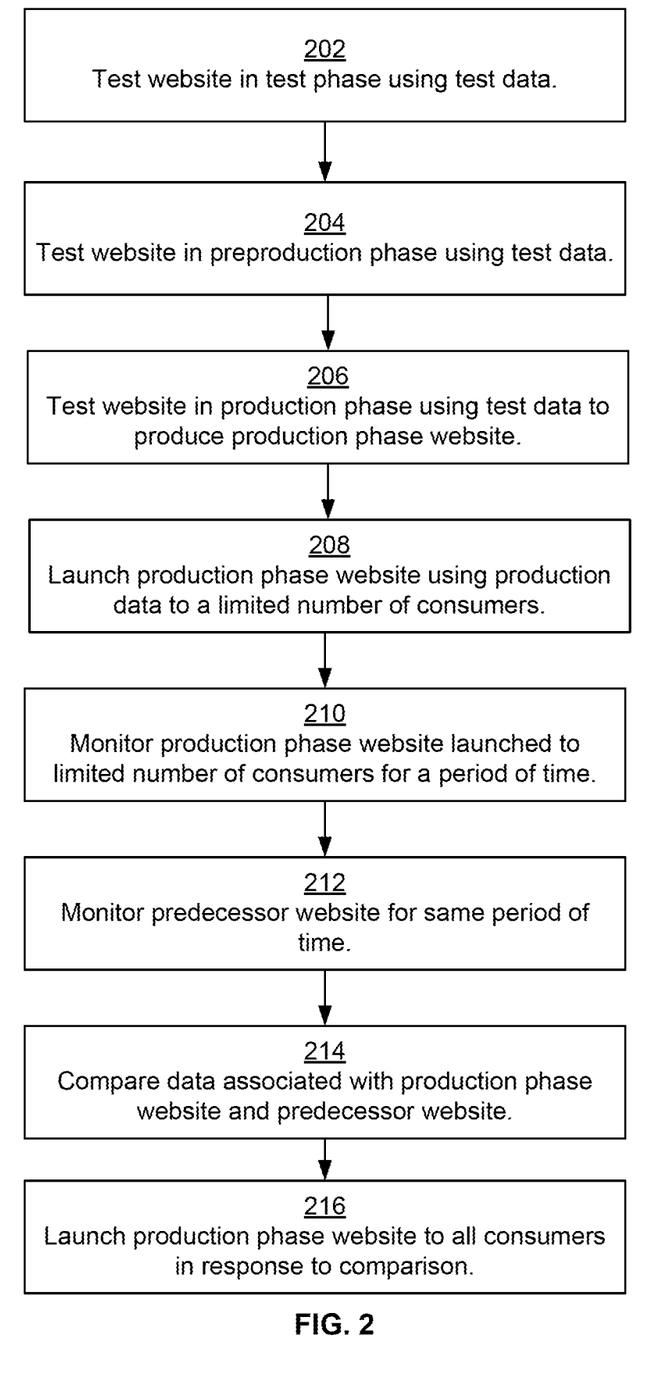
FIG. 2 illustrates, in accordance with various embodiments, a process for progressively launching a website.

As shown with respect to FIG. 2, an exemplary process 200 for progressively launching a website is shown. The process 200 may comprise, in various embodiments, testing a website in its first phase or its test phase (step 202). This test phase of the website may be tested based upon test data, as described above.

The process 200 may further comprise testing (e.g., in response to an acceptable performance evaluation during the test phase) the website in a second (or preproduction) phase, which may supersede the test phase (step 204). An acceptable performance evaluation may be based on any number of predefined test parameters, such as for example, website loading time, website errors and/or loading errors, and the like. The preproduction phase may (as with the test phase) utilize test data and be conducted on the soft-launch server 102.

The process 200 may further comprise testing, in response to an acceptable performance evaluation during the preproduction phase the website in a third (or production) phase, which may supersede the preproduction phase (step 206). An acceptable performance evaluation may be based on any number of predefined test parameters, such as for example, website loading time, website errors and/or loading errors, and the like. The production phase may, as with the preproduction phase, utilize test data and be conducted on the soft-launch server 102.

The process 200 may further comprise launching (i.e., making available to the public via the internet) the website in its production phase to a limited number of consumers (step 208). This may occur on the hard-launch server 104. The number of consumers may be less than all of the consumers who may experience or be exposed to the production phase website. The system may limit the launch to a subset of consumers by, for example, providing only certain consumers with passwords to access the web site, sending a link to the web site to only certain consumers, etc. The system may also limit the launch to a subset of consumers by, for example, redirecting the consumers to the website based on their User-ID, region, time of day, number of users, etc.

For example, the number of consumers who are exposed to the production phase website may comprise any percentage of consumers or subset of consumers. In one example, ten percent of all consumers experiencing the website may experience the production phase website. The production phase website may utilize production data, rather than test data, as described above. The remaining ninety percent of consumers may experience a prior version of a production phase website, which may also utilize actual production data and which may also be hosted by the hard-launch server 104. Thus, the production phase website may be slowly revealed or launched to consumers as in a stepped fashion.

The production phase website may be monitored or evaluated by a monitoring script (e.g., a software element constructed to monitor a variety of website behaviors, such as page load time, errors, and the like) for a period of time (step 210). This monitoring may occur during the initial launch stage, as described above, where the production phase website is only launched to a subset of consumers.

In various embodiments, the soft launch site may be offered to limited number of consumers in one of two ways. The business may decide with their own criteria to target certain consumers (list of accounts) or let the system randomly target a certain percentage (x %) of consumers satisfying a certain profile, wherein the 'x' may be configurable. The percentage of consumers may typically be less than 1% to start with and slowly moved up as confidence in the system is developed. The rational for letting the system randomly target a certain percentage of consumers is that the system likes a good homogeneous distribution of consumers testing the new site (e.g., non-skewed distribution of consumers). In addition, although the launch of the new site to the targeted consumers is transparent to them, to reduce any outage or customer dissatisfaction, all or any portion of the targeted consumers may have the ability to override it and go back to the predecessor site.

The existing or predecessor website (i.e., the website the production phase website will eventually take the place of) may be monitored or evaluated by a script in the manner described above (step 212). The system 100 may compare the results of each evaluation or monitoring to determine whether the production phase website is in a condition that is suitable to replace the existing website (step 214). More particularly, the system 100 may compare the results of the evaluation of the existing website to those of the production phase website, and if the evaluation results (e.g., the page load time, the number of page load errors, and the like) are within a threshold value of each other (e.g., ten percent), the system 100 may replace the existing website with the production phase website (in steps and/or in its entirety as described herein) (step 216).

More particularly, the production phase website may be revealed or launched to a first subset or number of consumers, and next to a second subset or number of consumers, and so forth until it is revealed or launched to all consumers (step 216). The process of revealing or launching the website in this fashion may depend upon an acceptable performance evaluation, as described herein, with the prior set of consumers. In various embodiments, the production phase website may be revealed or launched to a first subset of consumers, and if the production phase website receives an acceptable performance evaluation, it may be revealed or launched to all remaining consumers. Specifically, in response to an acceptable performance evaluation, the production phase website may be migrated to the hard-launch server 104 to replace its predecessor website.

However, if the evaluation results are not within a threshold of each other, the production phase website that is distributed to a limited number of users may be rolled back or replaced by the existing website until such time that the production phase website meets the evaluation criteria (i.e., the production phase website may be remodeled to improve its performance evaluation). As used herein, a website, migrating a website or replacing a website may include all pages of a website, a subset of pages of a website, all functionality, a portion of the functionality, all content, a portion of the content, etc.

In addition, the production phase website may be tested in its test, preproduction, and production phases, as described herein, on the soft-launch server 102 (using test data), and migrated to the hard-launch server 104 over time (with access to production data) and/or in response to a successful performance evaluation.

Thus, the systems and methods described herein may reduce or eliminate errors associated with a production phase website launch, in that the production phase website may be launched to a limited number of consumers with access to actual production data (rather than test data) to determine whether the production phase website is ready or suitable for a "full" launch—that is, whether the production phase website is suitable for replacement of its predecessor website.

The terms "payment vehicle," "financial transaction instrument," "transaction instrument," or "transaction account product" may be used interchangeably throughout to refer to a financial instrument. As used herein, an account code may or may not be associated with a physical financial instrument.

Phrases and terms similar to "financial institution," "transaction account issuer" and "payment processor" may include any person, entity, software and/or hardware that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases or terms similar to "transaction account" may include any account that may be used to facilitate a financial transaction. A "transaction account" as used herein refers to an account associated with an open account or a closed account system (as described herein). The transaction account may exist in a physical or non-physical embodiment. For example, a transaction account may be distributed in non-physical embodiments such as an account number, frequent-flyer account, and telephone calling account or the like. Furthermore, a physical embodiment of a transaction account may be distributed as a financial instrument.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

An "account", "account code", or "account number", as used herein, may include any device, code, number, letter, symbol, digital certificate, smart chip, digital signal, analog signal, biometric or other identifier/indicia suitably configured to allow the consumer to access, interact with or communicate with the system (e.g., one or more of an authorization/access code, personal identification number (PIN), Internet code, other identification code, and/or the like). The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, QR codes, Bluetooth, Near Field Communication, or a transponder and RFID reader in RF communication with the transponder (which may include a fob). Typical devices may include, for example, a key ring, tag, card, cell phone, wristwatch or any such form capable of being presented for interrogation.

Moreover, the system, computing unit or device discussed herein may include a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

The account code may be distributed and stored in any form of plastic, electronic, magnetic, radio frequency, wireless, audio and/or optical device capable of transmitting or downloading data from itself to a second device. A customer account code may be, for example, a sixteen-digit transaction account code, although each transaction account provider has its own numbering system, such as the fifteen-digit numbering system used by American Express. Each company's transaction account codes comply with that company's standardized format such that the company using a fifteen-digit format will generally use three-spaced sets of numbers, as represented by the number "0000 000000 00000". The first five to seven digits are reserved for processing purposes and identify the issuing bank, card type, etc. In this example, the last (fifteenth) digit is used as a sum check for the fifteen digit number. The intermediary eight-to-eleven digits are used to uniquely identify the customer. A merchant account code may be, for example, any number or alpha-numeric characters that identify a particular merchant for purposes of card acceptance, account reconciliation, reporting, or the like.

It should be noted that the transfer of information in accordance with the present disclosure, may be completed in a format recognizable by a merchant system or account issuer. In that regard, by way of example, the information may be transmitted from a contactless (e.g., an RFID device) to a contactless (e.g., RFID) reader or from the contactless reader to the merchant system in a variety of formats, e.g., magnetic stripe or multi-track magnetic stripe format.

In the detailed description herein, references to "one embodiment", "an embodiment", "an example embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in certain embodiments.

In various embodiments, the methods described herein are implemented using the various particular machines described herein. The methods described herein may be implemented using the particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT®, 95/98/2000, XP, Vista, OS2, UNIX®, LINUX®, SOLARIS®, MacOS, etc.) as well as various conventional support software and drivers typically associated with computers. A user may include any individual, business, entity, government organization, software and/or hardware that interact with a system.

In an embodiment, various components, modules, and/or engines of system 100 may be implemented as micro-applications or micro-apps. Micro-apps are typically deployed in the context of a mobile operating system, including for example, a Palm mobile operating system, a Windows mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

A firewall may comprise any hardware and/or software suitably configured to protect system 100 components and/or enterprise computing resources from users of other networks. Further, a firewall may be configured to limit or restrict access to various systems and components behind the firewall for web clients 102 connecting through a web server. A firewall may reside in varying configurations including Stateful Inspection, Proxy based, access control lists, and Packet Filtering among others. A firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

Encryption may be performed by way of any of the techniques now available in the art or which may become available—e.g., Twofish, RSA, El Gamal, Schorr signature, DSA, PGP, PKI, and symmetric and asymmetric cryptosystems.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, machine, hardware, software or business. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Phrases and terms similar to an "item" may include any good, service, information, experience, data, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

A "consumer profile" or "consumer profile data" may comprise any information or data about a consumer that describes an attribute associated with the consumer (e.g., a preference, an interest, demographic information, personally identifying information, and the like).

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., FACEBOOK®, YOUTube®, AppleTV®, Pandora®, xBox®, Sony® Playstation®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, FACEBOOK®, TWITTER®, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, MySpace®, LinkedIn®, and the like. Examples of affiliate or partner websites include American Express®, Groupon®, LivingSocial®, and the like. Moreover, examples of mobile device communications include texting, email, and mobile applications for smartphones.

As used herein, "match" or "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Phrases and terms similar to a "buyer," "participant", "consumer," and "user" may include any person, entity, software and/or hardware that receives items in exchange for consideration (e.g. financial payment). For example, a buyer may purchase, lease, rent, barter or otherwise obtain items from a supplier and pay the supplier using a transaction account.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the inventions have been described as a method in certain embodiments, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   directing, by a computer-based system, a first subset of consumers to a predecessor website that appears to the first subset of consumers as a production phase website;
   evaluating, by the computer-based system, a performance of the predecessor website;
   evaluating, by the computer-based system, a performance of the production phase website based upon a comparison of the performance of the production phase website to the performance of the predecessor website,
   wherein the performance is based on at least one of a website load time, a loading error or a website error;
   determining, by the computer-based system, that the evaluating meets pre-determined criteria;
   replacing, by the computer-based system, the predecessor website with the production phase website; and
   launching, by the computer-based system, the production phase website.

2. The method of claim 1, wherein the launching the production phase website is on a soft launch server.

3. The method of claim 1, wherein the replacing the predecessor website with the production phase website is on a hard launch server.

4. The method of claim 1, wherein the launching the production phase website is to the first subset of consumers.

5. The method of claim 1, wherein the launching the production phase website is to a second subset of consumers while the predecessor website is still available to the first subset of consumers.

6. The method of claim 1, wherein the launching the production phase website is to a second subset of consumers.

7. The method of claim 1, wherein the first subset of consumers includes at least one of a pre-determined list of consumers or a random percent of consumers that satisfy a profile.

8. The method of claim 1, wherein the launching the production phase web site is to the first subset of consumers at a first time and to a second subset of consumers at a second time.

9. The method of claim 1, wherein the evaluating uses monitoring script.

10. The method of claim 1, wherein any of the first subset of consumers request an override of the production phase website to replace the production phase website with the predecessor website.

11. The method of claim 1, wherein the launching the production phase website is to the first subset of consumers, and further comprising limiting access by the first subset of consumers by at least one of providing the first subset of consumers with passwords to access the production phase website, sending a link to the production phase website to the first subset of consumers, redirecting the first subset of consumers to the production phase web site based on a User-ID, redirecting the first subset of consumers to the production phase website based on consumer region, redirecting the first subset of consumers to the production phase website based on time of day, or redirecting the first subset of consumers to the production phase website based on number of users accessing the production phase website.

12. The method of claim 1, wherein the production phase website is evaluated based upon at least one of test data or production data.

13. The method of claim 1, wherein the predecessor website includes fabricated test data and the evaluating the performance of the predecessor website occurs prior to the predecessor website being available.

14. The method of claim 1, further comprising:
determining, by the computer-based system, that the evaluating fails to meet the pre-determined criteria;
rolling back, by the computer-based system, the production phase website to the predecessor website for the first subset of consumers; and
re-launching, by the computer-based system, the production phase website to the first subset of consumers, while the predecessor website is still available to a second subset of consumers.

15. The method of claim 1, wherein the production phase website includes real-time transaction data.

16. An article of manufacture including a non-transitory, tangible computer readable storage medium having instructions stored thereon that, in response to execution by a computer-based system, cause the computer-based system to perform operations comprising:
directing, by the computer-based system, a first subset of consumers to a predecessor website that appears to the first subset of consumers as a production phase website;
evaluating, by the computer-based system, a performance of the predecessor website;
evaluating, by the computer-based system, a performance of the production phase website based upon a comparison of the performance of the production phase website to the performance of the predecessor website,
wherein the performance is based on at least one of a website load time, a loading error or a website error;
determining, by the computer-based system, that the evaluating meets pre-determined criteria;
replacing, by the computer-based system, the predecessor website with the production phase website; and
launching, by the computer-based system, the production phase website.

17. The article of claim 16, wherein the launching the production phase website is to the first subset of consumers, and further comprising limiting access by the first subset of consumers by at least one of providing the first subset of consumers with passwords to access the production phase website, sending a link to the production phase website to the first subset of consumers, redirecting the first subset of consumers to the production phase web site based on a User-ID, redirecting the first subset of consumers to the production phase website based on consumer region, redirecting the first subset of consumers to the production phase website based on time of day, or redirecting the first subset of consumers to the production phase website based on number of users accessing the production phase website.

18. The article of claim 16, further comprising:
determining, by the computer-based system, that the evaluating fails to meet the pre-determined criteria;
rolling back, by the computer-based system, the production phase website to the predecessor web site for the first subset of consumers; and
re-launching, by the computer-based system, the production phase website to the first subset of consumers, while the predecessor website is still available to a second subset of consumers.

19. A system comprising:
a processor; and
a tangible, non-transitory memory communicating with the processor,
the tangible, non-transitory memory having instructions stored thereon that, in response to execution by the processor, cause the processor to perform operations;
directing, by the processor, a first subset of consumers to a predecessor website that appears to the first subset of consumers as a production phase website;
evaluating, by the processor, a performance of the predecessor website;
evaluating, by the processor, a performance of the production phase website based upon a comparison of the performance of the production phase website to the performance of the predecessor website,
wherein the performance is based on at least one of a website load time, a loading error or a website error;
determining, by the processor, that the evaluating meets pre-determined criteria;
replacing, by the processor, the predecessor website with the production phase website; and
launching, by the processor, the production phase website.

* * * * *